United States Patent
Spindler et al.

(10) Patent No.: US 8,301,516 B2
(45) Date of Patent: Oct. 30, 2012

(54) APPARATUS AND METHOD FOR MAINTAINING A CONSUMER PRODUCTS DATABASE

(75) Inventors: Michael Spindler, Barrington, IL (US); Cyndi Metallo, Kenosha, WI (US)

(73) Assignee: Gladson, LLC, Lisle, IL (US)

( * ) Notice: Subject to any disclaimer, the term of this patent is extended or adjusted under 35 U.S.C. 154(b) by 695 days.

(21) Appl. No.: 12/225,955

(22) PCT Filed: Apr. 4, 2007

(86) PCT No.: PCT/US2007/008457
§ 371 (c)(1),
(2), (4) Date: Sep. 1, 2009

(87) PCT Pub. No.: WO2007/114935
PCT Pub. Date: Oct. 11, 2007

(65) Prior Publication Data
US 2010/0070388 A1    Mar. 18, 2010

Related U.S. Application Data

(60) Provisional application No. 60/789,120, filed on Apr. 4, 2006.

(51) Int. Cl.
*G06Q 10/00*    (2012.01)
(52) U.S. Cl. ......................................... 705/28
(58) Field of Classification Search .................. 725/116, 725/109
See application file for complete search history.

(56) References Cited

U.S. PATENT DOCUMENTS

| | | | |
|---|---|---|---|
| 6,304,855 B1 | 10/2001 | Burke | |
| 7,194,756 B2 * | 3/2007 | Addington et al. | 725/116 |
| 2004/0088734 A1 * | 5/2004 | Donlan et al. | 725/109 |
| 2005/0068420 A1 | 3/2005 | Duggan et al. | |
| 2006/0015289 A1 | 1/2006 | Shakman et al. | |

OTHER PUBLICATIONS

Bhaduri, Anuket: Masters Thesis, University of Maine, *User Controlled Privacy Protection in Location-Based Services*, Dated 2003, (http://www.anuketbhaduri.com/resume/thesisAnuket.pdf).

* cited by examiner

*Primary Examiner* — Shay S Glass
(74) *Attorney, Agent, or Firm* — Pauley Petersen & Erickson

(57) ABSTRACT

This invention relates generally to an apparatus and a method for remotely capturing consumer product data and updating a consumer products database by a communication connection. A remote capture station provides data such as images and physical dimensions of consumer products for updating a consumer products database at a home location. This invention also relates to a method for consumer products database management including providing a capture station, engaging a consumer product with the capture station, capturing product data, transmitting the product data, and updating the consumer products database.

23 Claims, 4 Drawing Sheets

APPARATUS AND METHOD FOR MAINTAINING A CONSUMER PRODUCTS DATABASE

CROSS REFERENCE TO RELATED APPLICATION

This application claims the benefit of U.S. Provisional Application No. 60/789,120 filed on 4 Apr. 2006.

BACKGROUND OF THE INVENTION

1. Field of the Invention

This invention relates generally to an apparatus and a method for remotely capturing consumer product data and updating a consumer products database.

2. Discussion of Related Art

It is known to design planograms or shelf stocking plans for retail stores using, in part, measurements of the consumer products placed on the shelves. It may be advantageous for a retailer or outsourced planogram designer to readily have access to product dimensions in designing planograms rather than having at least one of each consumer product physically on hand. Shelf stocking can be done without a planogram but often may result in a time-consuming trial and error process or less than optimal use of shelf space.

Chain store retailers with multiple stores may gain benefits from the use of planograms by leveraging economies of scale. An outsource provider may avoid duplication of data for the same product being sold by different retailers by maintaining a central database of the information needed for planograms and advertising. Desirably, the database may be readily updated and contains the desired information for the latest consumer products.

There is a need and a desire for maintaining and updating a central database that can be easily updated to contain the latest consumer products information.

SUMMARY OF THE INVENTION

It is desirable to provide a consumer products database management method and apparatus to at least in part facilitate consumer product data capture from a remote location to update the consumer products database.

The above and other objects of this invention can be attained, at least in part, with a method for consumer product database management which includes the steps of providing a capture station at a remote location, engaging a consumer product with the capture station, capturing product data from the consumer product using at least one input device, transmitting the product data from the capture station to a home location, and updating the client accessible database of consumer products with the product data.

The product data may include graphics, images, bar codes, sounds, physical dimensions, heights, lengths, depths, weights, text, nutritional information, ingredient lists, and metadata.

A remote user may manipulate the consumer product to facilitate product data capture while a home user may instruct the remote user during the product data capture which may be over a video conference. Optionally, the home user may remotely operate the input device on the capture station.

Connection between the remote location and home location may include the internet. Data storage on the capture station may be temporary and erased following transmission. The database may include outputs to a recordable medium and the product data may be further formatted depending on needs and use, such as, for example, for space management data coding and/or e-commerce data coding.

Typical consumer products may include at least one of groceries, food, health, beauty, electronics, household, apparel, hardware, compact discs, and books. Typical remote locations may include a retailer.

According to another embodiment of this invention, database management may include: providing a capture station at a remote location; engaging a consumer product with the capture station; scanning a bar code on the consumer product; taking digital images of the consumer product; taking digital dimensions of the consumer product; weighing the consumer product on a digital scale; inputting metadata for the consumer product; transmitting product data from the capture station to a home location; and updating a database of consumer products with the product data. Transmitting may occur after each product data capture step.

The invention further includes an apparatus for consumer product data capture and database management which may include a remote located capture station having a remote computer with an input device, a home computer connecting with a consumer products database, and a communication connection between the remote computer and the home computer.

Typical input devices may include a digital camera, a bar code scanner, a digital video camera, a microphone, a keyboard, an electronic caliper, a digital micrometer, a laser measuring device, a three-dimensional laser scanner, an ultrasonic measuring device, an electronic tape measure, an integrated dimensioning and weighing device, a digital balance and an electronic scale. Optionally, lighting and background for the consumer product 14 may help provide consistent images between different consumer products 14 captured at the same or different remote locations. Capture station 12 may also be placed at the home location.

Data may be recorded in varying formats within the consumer products database 22. Desirably, image data may be stored in TARGA 32 format.

Other objects and advantages will be apparent to those skilled in the art from the following detailed description taken in conjunction with the appended claims and the drawings.

BRIEF DESCRIPTION OF THE DRAWINGS

The above and other objects of this invention can be better understood when the specification is read in view of the drawings, wherein.

DETAILED DESCRIPTION OF THE INVENTION

Figure 1:
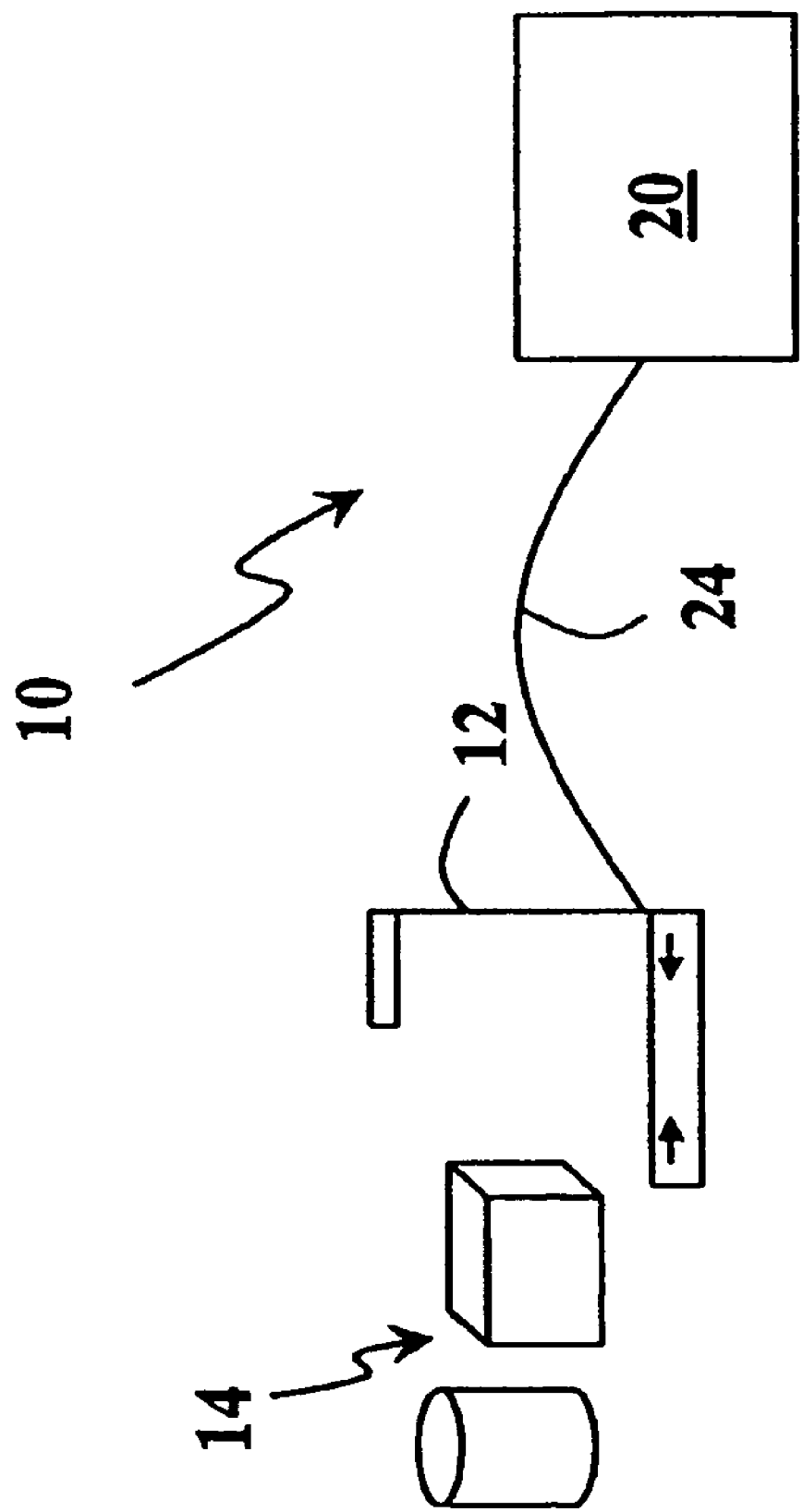
FIG. 1 is a schematic of the consumer products data capture station and the database, according to one preferred embodiment of this invention.

FIG. 1 shows a schematic of the apparatus 10 for consumer products data capture and the database 22 according to a preferred embodiment of this invention. Apparatus 10 may include capture station 12 located at a remote location. A remote location may be generally any other location than where consumer products database 22 resides. Desirably, capture station 12 may be located at a premise owned by a retailer including a store, warehouse, sales office, division office, headquarters; or any other suitable location that a retailer and/or a manufacturer's representative may readily access. Alternately, capture station 12 may be located at a manufacturer's location. According to a preferred embodiment of this invention, capture station 12 is located in a lobby of a headquarters building for a chain store retailer. Desirably, many capture stations 12 may be placed at different remote locations to aid or facilitate in database 22 management.

Typical retail establishments may include, without limitation, drug stores, pharmacies, grocery stores, electronics stores, wholesale clubs, discount stores, department stores, big-box stores, and any other suitable sales or vending establishment.

Consumer products 14 may include broadly any material that is purchased by a consumer, a patron, or a customer and may include, for example, without limitation, groceries, food, health, beauty, electronics, household, apparel, hardware, compact discs, and/or books. A consumer generally may be, but not necessarily, an end user of a purchased good. Consumer products 14 may include any size or quantity of materials, especially those suitable for stocking or inventorying on shelves, racks, peg-and-hook boards, or any other suitable sales stand. Goods or products purchased and sold by e-commerce (internet) and/or conventional brick-and-mortar stores may offer additional convenience for a shopper to buy consumer products 14. According to a preferred embodiment of this invention, consumer products 14 include packaging with graphics, metadata, and/or any other design to attract a shopper's attention and purchase.

Typically, packaging may include boxes, cartons, containers, bags, packets, vacuum-formed blister packs, and any other suitable design to contain and convey the product for sale. Packaging may be of any shape including, without limitation, cubes, drums, regular shapes, irregular shapes, rigid forms, soft forms, or any other suitable package for selling product.

Apparatus 10 desirably connects to home computer 20 by communication connection 24. Communication connection 24 may include a signal transmission system such as, for example, serial, parallel, dedicated ethernet, wireless, blue tooth, fiber optic, fractional data highway, satellite, or any other suitable communication protocol for passing data and/or information. According to a preferred embodiment of this invention, communication connection 24 is by the world wide web (internet) using high speed service providers. Alternately, communication connection 24 exists by use of other sending mechanisms such a verbal, fax, mail, post, and manual transport.

Home computer 20 may include consumer products database 22 for storing, housing, maintaining, and/or serving consumer products data. Database 22 may be static or dynamic in the working memory of a computer, stored on a device such as a hard drive, and combinations thereof. Database 22 storage may include, without limitation, hard drives, CD-ROMs, flash memory, magnetic tape, and any other suitable tangible recordable media. According to a preferred embodiment of this invention, home computer 20 includes a redundant hard disk array for storing consumer products database 22.

Database 22 may include any generally substantially organized collection of fields of data or information. Representative data may include combinations of text, numbers, graphics, images, sound, animation, video, and any other suitable fact or item useful to describe or associate with consumer products 14. Desirably, data may include product data including high resolution graphics, carton dimensional information including length, width, depth, height, volume, weight, and any other suitable measured quantity. Audio and/or video of demonstrations or use of consumer product 14 may also be included in database 22. Bar code data may be particularly useful for indexing and/or querying consumer product data in database 22. Nutritional information and/or ingredient lists may also be captured or input into database 22.

Nutritional information as may be recorded off product packages, such as, for example, calories or percent fat, may be an example of metadata captured in database 22. The metadata, such as, for example, contents, manufacturer's location and lot numbers, may be useful for providing different data mining options such as, for example, seeking to exclude products based on nut allergies. Metadata broadly may include "data about data" and it can generally be thought of as information that describes, or supplements, the central data. Particularly, metadata may include information about product dimensions and container type.

Uses of consumer product 14 data may include digital product images, such as, for example, in advertising and e-commerce, dimensional content for space management, such as, for example, designing a planogram for store shelf stocking plans, and provide clients or customers with a 24 hour a day/7 day a week access to a comprehensive data repository for retrieval and query.

Figure 2:
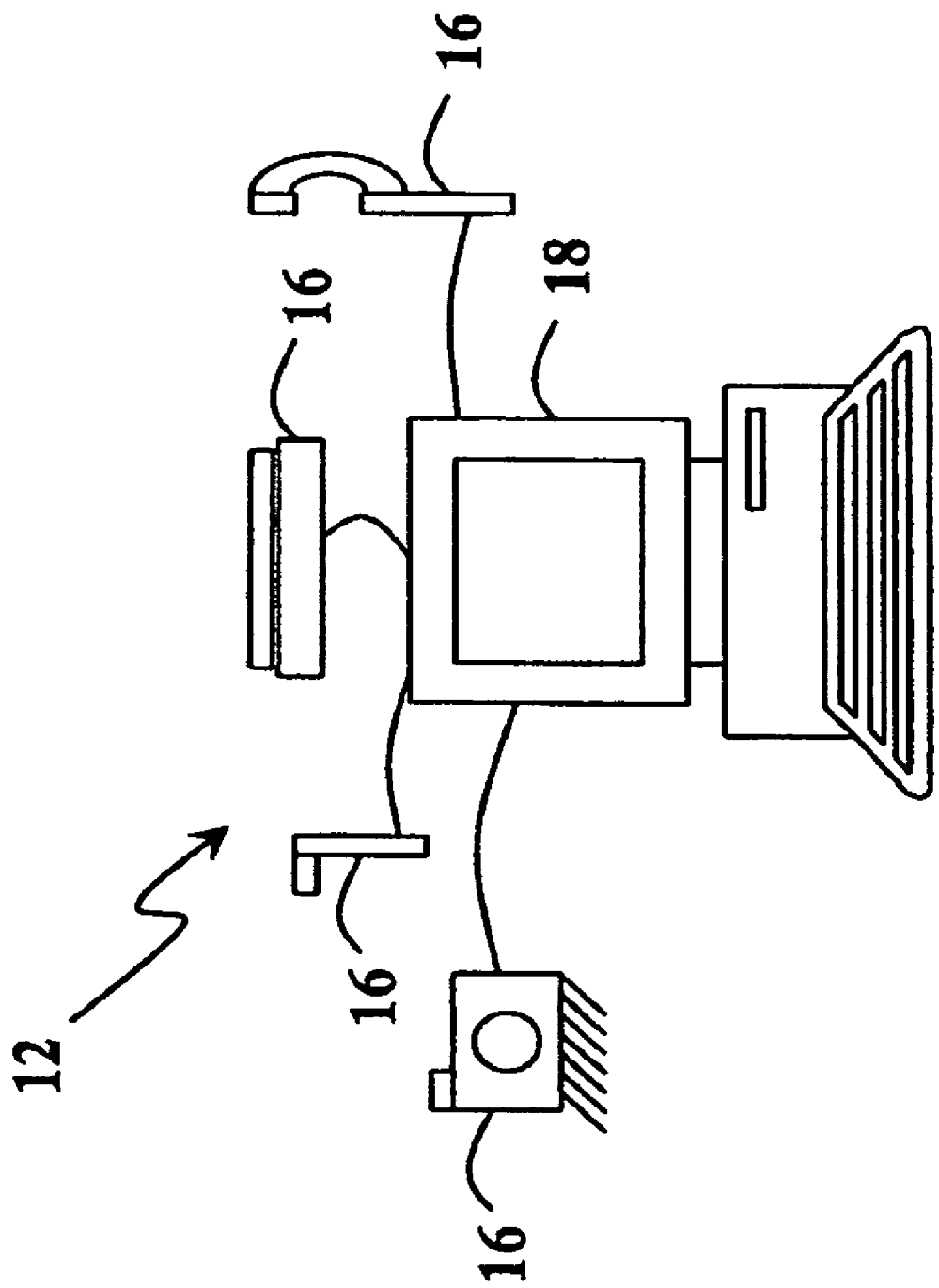
FIG. 2 is a schematic of the capture station, according to a preferred embodiment of this invention.

As shown in FIG. 2 and according to a preferred embodiment of this invention, capture station 12, also sometimes referred to as an OUTPOST™ capture station, includes a remote computer 18 having at least one input device 16. Input device 16 may include a digital camera, a bar code scanner, a digital video camera, a microphone, a keyboard, an electronic caliper, a digital micrometer, a laser measuring device, a three-dimensional laser scanner, an ultrasonic measuring device, an electronic tape measure, a digital balance, an electronic scale and any other suitable device or instrument to provide electronically or digitally data input or acquisition to capture station 12. According to a preferred embodiment of this invention, input device 16 includes an integrated weighing and laser dimensioning device such as, for example, a Cubiscan® available from Quantronix, Inc.

Alternately, measurements or readings may be taken with manual or analog devices and keyed into capture station 12.

Figure 3:
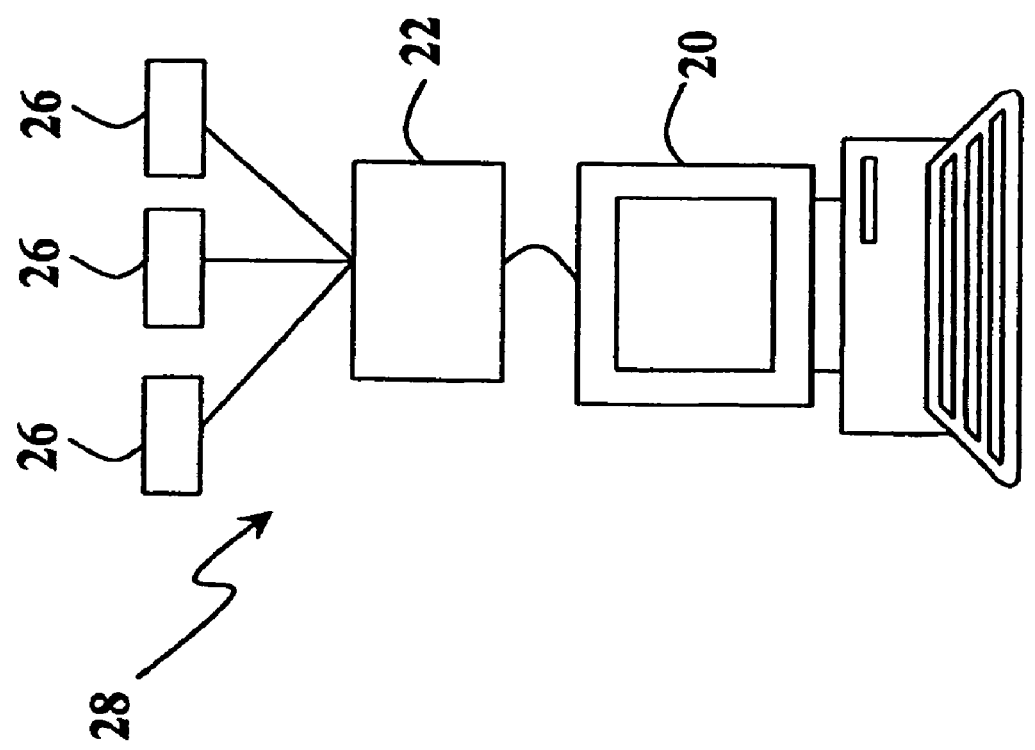
FIG. 3 is a schematic of the home location, according to one preferred embodiment of this invention.

As shown in FIG. 3 and according to a preferred embodiment of this invention, home location 28 may include home computer 20 coupled to database 22 which is client 26 accessible. Home location 28 may generally include a place other than remote location. Home location 28 may include one or more distributed and/or redundant systems. According to a preferred embodiment of this invention, home location 28 is a global headquarters for a provider of digital product images and label content for space management, planogram outsourcing and e-commerce.

Figure 4:
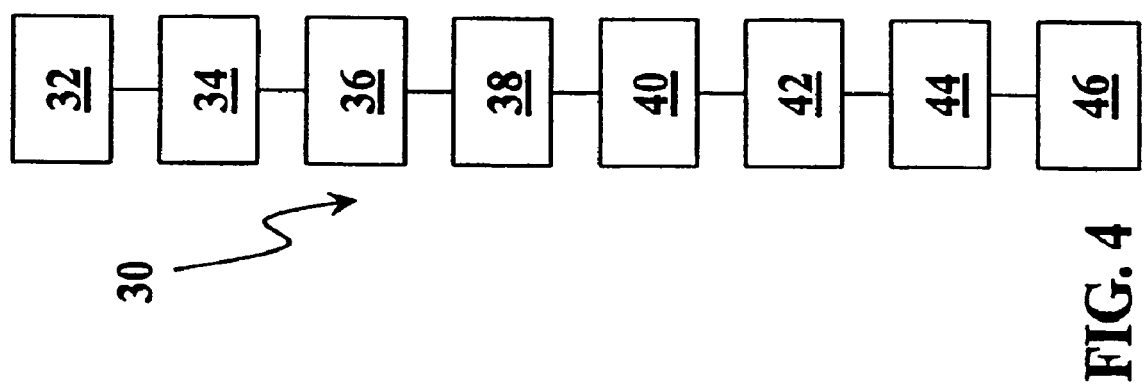
FIG. 4 is a flow diagram of the method for maintaining a consumer products database, according to one preferred embodiment of this invention.

This invention also includes method 30 as shown by a flow diagram in FIG. 4 and according to a preferred embodiment of this invention. Method 30 may include at least one of the following steps and/or any suitable additional steps to update database 22:

providing 32 capture station 12 at a remote location;
engaging 34 a consumer product 14 with capture station 12;
scanning 36 a bar code on consumer product 14;
taking 38 one or more digital images of consumer product 14;
measuring and/or recording 40 one or more digital dimensions of consumer product 14;
weighing 42 consumer product 12 on a digital scale;
inputting 44 metadata for consumer product 14;

transmitting 46 product data from capture station 12 to a home location 28; and updating 48 database 22 of consumer products 14 with the product data.

The above steps are taken generally without limitation or inference as to order or sequence and may further include one or more repetitions or repeats of any step or combinations of steps.

Database management may broadly include adding, creating, purging, deleting, erasing, editing, supplementing, augmenting, combining, or any other suitable step to update database 22. Providing 32 may broadly include installing, powering, connecting, or any other suitable steps necessary to prepare capture station 12 for use, input, or scanning. Engaging 34 may broadly encompass placing, setting, attaching, or any other suitable action to ready consumer product 14 for data capture. Capturing may broadly include scanning, measuring, taking, inputting, keying, photographing, or any other suitable action to input data into capture station 12. Scanning 36 may broadly include reading a combination of substantially unequally spaced substantially parallel lines or number lists. Taking 38 may broadly include collecting images or views preferably by an electronics device. Measuring may broadly include reading or dimensioning using a properly calibrated suitable device. A ruler in whole inches may not be a suitable device for measuring a thickness of a sheet of paper (thousandths of an inch). Generally, any input device 16 may have improved accuracy with proper calibration methods and intervals. Transmitting 46 may generally include sending, releasing, conveying or other suitable action to move data from capture station 12 to home location 28. Transmitting 46 may include following each data capture or batch-wise with all of the data for single or multiple consumer products 14. According to a preferred embodiment of this invention, transmitting 46 occurs during data acquisition following each step 36-44 and in a substantially real-time manner. Updating 48 may broadly include any of the above steps of database management with product data.

Measuring may be made by placing consumer products 14 on a designated location or default, such as may be marked by an "X", calibration point or a generally siting outline for placement. Desirably, the designated location may be located on or within capture station 12. As shown in FIG. 1 and according to a preferred embodiment of this invention, the calibration point includes two arrows where an object is placed in between. This may help to ensure consistent data between different consumer products 14, such as, for example, between a box of laundry soap and a loaf of bread. Automated systems may then scan and/or measure the consumer product 14, such as, for example by a laser or ultrasonic measuring device that substantially does not require physical contact with consumer product 14. Alternatively, measuring may include a user picking up or handling consumer product 14 to apply or use a contact measuring device, such as, for example a tape measure or a caliper. Typically, one or more dimension can be taken or made in this manner, such as, for example a length, a width, and a depth of a substantially six-sided carton.

Apparatus 10 may include automation including conveyors and/or robotic processing to aid, assist or facilitate data capture. Alternately, a remote user or person, such as for example, a manufacturer's representative may aid in data capture by placing, turning, aligning, manipulating or any other suitable step or motion to aid in data capture. The remote user may provide input or operation of input device 16. According to a preferred embodiment of this invention, a home user, such as, for example, a company employee, may control, instruct or guide the data capture process. A home user may judge product qualifications for inclusion in database 22 and/or provide quality control and data assurance for captured product data before incorporating into database 22. A home user may themself be an outsourced employee located at home location 28 or located in another, such as, for example, in a technical support center located on another continent.

Capture station 12 and home computer 20 may include video conferencing for a remote user and a home user to communicate or exchange during the data capture process 30. According to a preferred embodiment of this invention, a home user may remotely operate or work input device 16 on capture station 12.

Capture station 12 may include at least some media storage to temporarily or permanently store or archive product data. According to a preferred embodiment of this invention, product data does not permanently reside on capture station 12 but is deleted or removed following transmitting 46 or sending of product data.

Client 26 accessible may generally include allowing access or reading and/or copying at least some fields or content of database 22 by a customer of the database company. According to a preferred embodiment of this invention, client 26 access to database 22 may be by an interface on a website of the internet. Appropriate security measures or restrictions may be included to safeguard database 22 integrity and/or client relationships. For example, a client may only have access to a limited section of database 22 depending upon a subscription or contractual arrangement with the database company. Desirably, database company may maintain several databases 22 and serve multiple clients 26.

Method 30 may include formatting, adjusting or manipulating the product data. Various algorithms and/or software such as, for example, GAPICS may be used format data. According to a preferred embodiment of this invention, formatting is done for space management data coding and e-commerce data coding.

Database records may be stored in a variety of file formats or conventions. In particular, graphic or image formats may include different formats or types and resolutions or densities depending on desired end or client uses, such as, for example, a full color glossy full page magazine advertisement may need a higher pixel content than a thumbnail version for a black and white shelf image. According to a preferred embodiment of this invention, image data is captured at 300 dpi (dots per inch) in a jpeg (joint photographic experts group) format and then stored at 300 dpi, jpeg; 150 dpi, jpeg; TARGA 32 (truevision graphics adapter, TGA); and TARGA 16 format.

Capture station 12 may include additional devices to provide consistent data capture such as graphics of consumer products 14. According to a preferred embodiment of this invention, capture station 12 may include lighting and/or backgrounds. Suitable backgrounds may offer more than one color choice depending upon the colors of the item captured. One or more commercial and/or proprietary software programs may be used to facilitate method 30 on home computer 20 or remote computer 18.

EXAMPLE

An example, without limitation, of the use of this invention may generally occur as follows. A database operator and planogram provider has an office. The database operator maintains several consumer products databases including images of consumer goods, physical dimensions and/or other data such as nutritional information. These databases reside on a computer. An OUTPOST™ capture station is placed in a major chain drugstore's retail headquarters which is located in a different city than the database operator. The OUTPOST™ capture station is the primary means of remotely collecting information and updating the databases. The OUTPOST™ capture station includes a bar code scanner, a Cubiscan®, a high resolution digital camera, and video conferencing equipment (audio and video). These devices are connected to a computer in the retailer's lobby and connected to the internet by a high speed service provider.

A manufacturer's representative has a new product such as an improved lipstick and has arranged a meeting with executives at the retailer to discuss buying the lipstick from the manufacturer and selling it in the drugstores. Upon arrival at the lobby, the manufacturer's representative may see the OUTPOST™ capture station and place a sample of item on the target location. Next, he can initiate a video conference with a technician at the database operator's office. The technician decides if the lipstick should be included in the database and then provides instruction to the manufacturer's representative on how to use the OUTPOST™ capture station.

First, the manufacturer's representative scans in the universal product code (UPC) from the lipstick package. Then the technician directs the manufacturer's representative on lipstick orientation to take high resolution digital photographs of the front, sides and back of the lipstick package. The manufacturer's representative is told by the technician how to adjust lighting and backgrounds on the OUTPOST™ capture station to provide consistent high quality images.

Next, the technician remotely controls the focus, flash, exposure and the activation of the digital camera. Images are sent to the technician in real time for viewing on a computer at his location. The technician judges the images for quality and repeats if necessary.

The technician then provides instruction for the manufacturer's representative to measure the lipstick container using the combined weighing and dimensioning device. The dimensions including mass, length, width, and depth are sent to the technician. The technician then instructs the manufacturers' representative to manually type in additional information about the product. A list of ingredients is keyed in and sent to the technician. The technician then updates the database with the images, dimensions and ingredients. The technician also manipulates the images for editing and format to save database disk space.

The manufacturer's representative then has a meeting with the retailer who decides to make a nationwide roll out of the new lipstick in three weeks. The retailer contacts the database operator and planogram provider to create new stocking plans for the lipstick aisle in the drugstores. Since, the images and dimensions of the new lip stick are already in the database, the new stocking plans are readily created and supplied to the retailer and seamlessly integrated with the existing lipstick products on the retailer's store shelves.

While in the foregoing specification this invention has been described in relation to certain embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for consumer product database management, the method comprising:
   providing a capture station at a remote location;
   engaging a consumer product with the capture station, wherein the consumer product includes any tangible good that is purchased by a consumer in a retail environment;
   capturing product data from the consumer product using at least one input device, wherein the product data comprises at least one product image and at least one of graphics, bar codes, sounds, heights, lengths, depths, weights, text, nutritional information, ingredient lists, and metadata;
   transmitting the product data from the capture station to a home location;
   updating a database of consumer products with the product data resulting in an updated database of related consumer goods including at least one of groceries, food, health, beauty, electronics, household, apparel, hardware, compact discs, and books; and
   space management data coding and e-commerce data coding to provide a user with a resource for at least one of space management, advertising and e-commerce.

2. The method of claim 1, wherein the product data comprises at least one image and at least one dimension.

3. The method of claim 1, further comprising a remote user manipulating the consumer product to facilitate product data capture.

4. The method of claim 3, further comprising a home user instructing the remote user during the product data capture.

5. The method of claim 1, further comprising video conferencing between a remote user and a home user.

6. The method of claim 1, further comprising a home user remotely operating the input device on the capture station.

7. The method of claim 1, further comprising deleting the product data from the capture station following transmitting the product data.

8. The method of claim 1, wherein the database of consumer products is client accessible.

9. The method of claim 1, wherein the updating includes writing the product data to a recordable medium.

10. The method of claim 1, further comprising formatting the product data.

11. A method for consumer product database management, the method comprising:
    providing a capture station at a remote location;
    engaging a consumer product with the capture station, wherein the consumer product includes any tangible good that is purchased by a consumer in a retail environment;
    scanning a bar code on the consumer product;
    taking at least one digital image of the consumer product;
    measuring at least one digital dimension of the consumer product;
    weighing the consumer product on a digital scale;
    inputting metadata for the consumer product;
    transmitting product data from the capture station to a home location;
    updating a database of consumer products with the product data; and
    space management data coding and e-commerce data coding to provide a user with a resource for at least one of space management, advertising and e-commerce.

12. The method of claim 1, wherein the remote location is a retailer.

13. The method of claim 11, wherein the consumer products include at least one of groceries, food, health, beauty, electronics, household, apparel, hardware, compact discs, and books.

14. The method of claim 11, wherein the transmitting occurs after each product data capture step.

15. An apparatus for accomplishing the steps of claim 11 for consumer product data capture and database management, the apparatus comprising;
- a remote located capture station having a remote computer with an input device;
- a home computer connecting with a consumer products database; and
- a communication connection between the remote computer and the home computer.

16. The apparatus of claim 15, wherein the input device comprises at least one of the group consisting of a digital camera, a bar code scanner, a digital video camera, a microphone, a keyboard, an electronic caliper, a digital micrometer, a laser measuring device, a three-dimensional laser scanner, an ultrasonic measuring device, an electronic tape measure, and a scale.

17. The apparatus of claim 15, wherein the communication connection is the internet.

18. The apparatus of claim 15, further comprising:
- lighting positioned with respect to the capture station; and
- background positioned with respect to the capture station for reproducing consistent images of the consumer product.

19. The apparatus of claim 15, wherein the consumer product includes at least one of groceries, food, health, beauty, electronics, household, apparel, hardware, compact disks and books.

20. The apparatus of claim 15, wherein product image data is stored in TARGA 32 format.

21. The apparatus of claim 15, wherein the consumer products database is client accessible.

22. The apparatus of claim 15, wherein the capture station stores product data only until transmission.

23. The apparatus of claim 15, wherein the input device includes an integrated dimensioning and weighing device.

\* \* \* \* \*